United States Patent [19]

Nakamura et al.

[11] Patent Number: 5,458,937
[45] Date of Patent: Oct. 17, 1995

[54] SEMICONDUCTOR ROLL

[75] Inventors: Tsutomu Nakamura, Annaka; Kazuo Numata, Usui, both of Japan

[73] Assignee: Shin-Etsu Chemical Co., Ltd., Tokyo, Japan

[21] Appl. No.: 186,078

[22] Filed: Jan. 25, 1994

[30] Foreign Application Priority Data

Jan. 25, 1993 [JP] Japan ................................. 5-028691

[51] Int. Cl.⁶ .............................. B32B 1/08; G03G 15/20
[52] U.S. Cl. ................. 428/36.91; 252/502; 252/506; 252/507; 355/219; 355/259; 355/271; 428/325; 428/327; 428/328; 428/331; 428/408; 428/447; 428/450; 492/56; 492/59
[58] Field of Search ................. 29/895.32; 252/502, 252/506, 507; 428/36.91, 36.92, 327, 331, 408, 447, 450, 325, 328; 524/431, 432, 588; 355/219, 259, 271, 273, 274, 276

[56] References Cited

U.S. PATENT DOCUMENTS

| 4,970,098 | 11/1990 | Ayala-Esquilin et al. | 428/36.4 |
| 4,990,963 | 2/1991 | Yamamoto et al. | 355/259 |
| 5,195,228 | 3/1993 | Fukunaga et al. | 492/53 X |

*Primary Examiner*—D. S. Nakarani
*Attorney, Agent, or Firm*—Millen, White, Zelano & Branigan

[57] ABSTRACT

A semiconductive roll is prepared by molding and curing a silicone rubber composition to a mandrel to form a semiconductive layer. The silicone rubber composition includes (A) 100 parts by weight of a diorganopolysiloxane, (B) 5 to 200 parts by weight of spherical silicone elastomer particles having a mean particle size of 0.1 to 100 μm, and (C) a conductive material, typically conductive carbon black, zinc oxide or titanium oxide. The roll has stable, minimal varying resistivity in the semiconductive region which does not depend on molding conditions.

17 Claims, 1 Drawing Sheet

SEMICONDUCTOR ROLL

BACKGROUND OF THE INVENTION

1. Field of the Invention

This invention relates to a semiconductor roll exhibiting a stable electric resistivity in the semiconductive range of $10^3$ to $10^{10}$ ohm-cm.

2. Prior Art

A number of electroconductive rubbers are available as mixtures of electrically insulating rubber material and electroconductive agents. For example, carbon black and other conductive agents are blended in rubbers to provide conductive rubbers with an electric resistivity of from $10^{-1}$ to $10^2$ $\Omega$-cm, which are used in various applications.

Silicone rubber is also widely used as electrically insulating rubber because of its heat resistance, low temperature resistance and weatherability. It can also be used as a conductive silicone rubber by adding conductive agents such as other rubber materials.

The conductive agents which are added to silicone rubber for imparting electric conductivity are typically carbon black, graphite, various metal powders such as silver, nickel, and copper, various non-conductive particles and short fibers surface treated with silver or similar metals, carbon fibers, and metallic fibers. By mixing these conductive agents, the resistivity of silicone rubber can be reduced to the order of $10^{10}$ to $10^{-3}$ $\Omega$-cm depending on the type and amount of conductive agent without detracting from the inherent properties of silicone rubber.

When silicone rubber is blended with conductive carbon black such as Ketjen Black and acetylene black, however, the resulting compositions show great resistivity variations in the semiconductive region of $10^3$ to $10^{10}$ $\Omega$-cm. It is difficult to provide stable electrical resistivity probably because the dispersion of carbon considerably varies with molding conditions.

In the manufacture of business machine parts including those used in dry copying machines, for example, rubber rolls such as rolls for charging, transfer, developing, paper feed, fixing, pressing, electricity removal, cleaning, and oil application, the industry is now searching for materials having semiconductive characteristics. There is a need for a semiconductive roll which has stable resistivity with minimal variation in the semiconductive region.

SUMMARY OF THE INVENTION

Therefore, an object of the present invention is to provide a novel and improved semiconductive roll having electrical resistivity with minimal variation in the semiconductive region. Another object of the present invention is to provide a semiconductive roll having stable resistivity which does not depend on molding conditions.

According to the present invention, there is provided a semiconductive roll comprising a cylindrical mandrel and a semiconductive silicone rubber layer enclosing the mandrel. The semiconductor layer is obtained by molding a silicone rubber composition around the mandrel and curing the composition thereto. The silicone rubber composition includes (A) 100 parts by weight of an organopolysiloxane of the following average compositional formula (1):

$$R_nSiO_{(4-n)/2} \tag{1}$$

wherein R is a substituted or unsubstituted monovalent hydrocarbon group and n is a positive number of 1.95 to 2.05, (B) 5 to 200 parts by weight of spherical silicone elastomer particles having a mean particle size of 0.1 to 100 µm, and (C) a conductive material, typically conductive carbon black, zinc oxide or titanium oxide. The semiconductive silicone rubber layer has a stable resistivity which varies only over the range of two orders of magnitude in the semiconductive region of $10^3$ to $10^{10}$ $\Omega$-cm. The semiconductive roll having such stable resistivity is best suited for use in a developing section, especially as a triboelectric charging roll, transfer roll and developing roll in a developing apparatus.

Briefly stated, the present invention provides a semiconductive roll comprising a mandrel having formed thereon a semiconductive cured layer of a silicone rubber composition including (A) an organopolysiloxane of formula (1), (B) spherical silicone elastomer particles, and (C) a conductive material.

BRIEF DESCRIPTION OF THE DRAWING

The only FIGURE, FIG. 1 schematically illustrates how to measure the electric resistance of a semiconductive roll according to the invention.

DETAILED DESCRIPTION OF THE INVENTION

Figure 1:
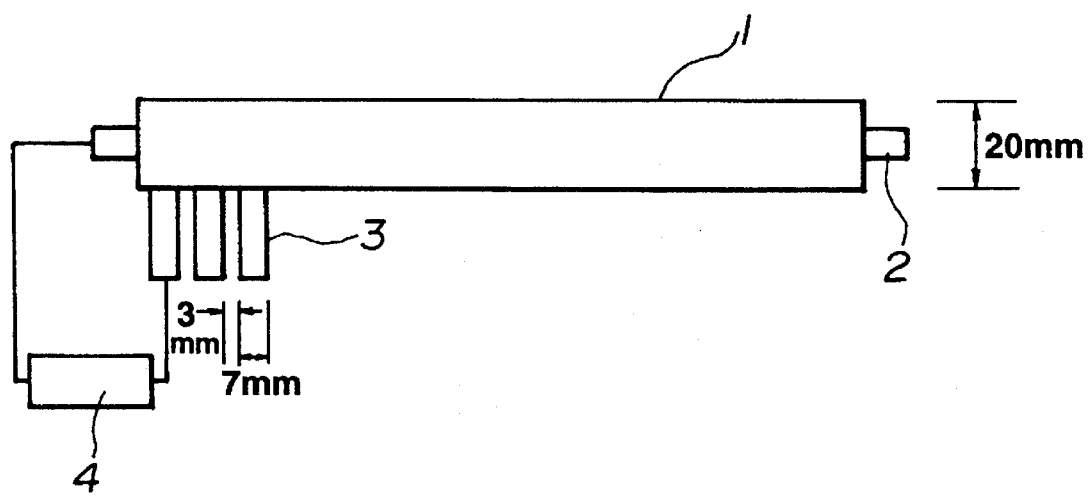

Component (A) of the silicone rubber composition according to the present invention is a diorganopolysiloxane of average compositional formula (1):

$$R_nSiO_{(4-n)/2} \tag{1}$$

In formula (1), letter n is a positive number of 1.95 to 2.05. R is a substituted or unsubstituted monovalent hydrocarbon group, preferably having 1 to 10 carbon atoms, especially 1 to 8 carbon atoms. Examples of the monovalent hydrocarbon group include alkyl groups such as methyl, ethyl, and propyl groups; cycloalkyl groups such as cyclopentyl and cyclohexyl groups; alkenyl groups such as vinyl and allyl groups; cycloalkenyl groups; aryl groups such as phenyl and tolyl groups; and halogenated hydrocarbon groups and cyano-hydrocarbon groups wherein some or all of the hydrogen atoms are replaced by organic groups such as chlorine atoms, cyano groups or the like. Preferred organopolysiloxanes are those having a backbone of dimethylpolysiloxane units with or without phenyl, vinyl, 3,3,3-trifluoropropyl groups incorporated therein.

The diorganopolysiloxane should preferably have an alkenyl group in an amount of 0.02 to 5 mol % of R.

The diorganopolysiloxane preferably has a degree of polymerization of at least 100 because below this level, the composition would be less moldable and the cured product would have low mechanical strength. Preferably, the degree of polymerization is in the range of 1,000 to 30,000, more preferably 3,000 to 10,000.

Component (B) is spherical particles of a silicone elastomer having a mean particle size of 0.1 to 100 µm, preferably 0.5 to 40 µm. Particles having a mean particle size of less than 0.1 µm are difficult to prepare and less effective when added whereas particles having a mean particle size of more than 100 µm are detrimental to rubber mechanical strength.

The spherical silicone elastomer particles are not limited in type, grade, manufacturing process and the like as long as they are of cured organopolysiloxane and have the above-defined particle size. Illustrative, non-limiting examples of the spherical silicone elastomer include silicone elastomer particles prepared by curing a curable organosiloxane composition in a spray dryer at 230° to 300° C. as disclosed in JP-A 96122/1984; and silicone elastomer particles prepared by emulsifying a curable organosiloxane composition, for example, an addition reaction type organopolysiloxane composition comprising a vinyl-containing organopolysiloxane and an organohydrogenpolysiloxane in water with the aid of a surfactant so that emulsified particles may have a size of up to 20 μm, adding a platinum series catalyst for addition reaction, and spray drying the emulsion, with the organopolysiloxane in the emulsified particles being cured before spray drying or until the end of spray drying as disclosed in JP-A 257939/1987. Preferred silicone elastomer particles are prepared by emulsifying a vinyl-containing organopolysiloxane and an organohydrogenpolysiloxane in water with the aid of a surfactant and effecting addition reaction in the presence of a platinum series catalyst for curing. The silicone elastomer particles on their surface may be treated with silanes, siloxanes or the like previously or during their preparation.

The amount of spherical silicone elastomer particles used is 5 to 200 parts, preferably 10 to 150 parts by weight per 100 parts by weight of diorganopolysiloxane (A). Less contents of elastomer particles are not effective whereas a composition containing an excessive amount of elastomer particles results in a cured product with low mechanical strength.

The electroconductive material (C) is conductive carbon black, conductive zinc oxide, conductive titanium oxide, graphite, silver or nickel coated glass beads, or a mixture of two or more. Among them, conductive carbon black, conductive zinc oxide and conductive titanium oxide are preferred.

Conductive carbon black may be selected from various types of carbon black commonly used in conductive rubber compositions. Examples include acetylene black, conducting furnace black (CF), super conducting furnace black (SCF), extra conducting furnace black (XCF), conducting channel black (CC), and furnace black and channel black heat treated at elevated temperatures of about 1,500° C. More particularly, the acetylene black includes Denka Acetylene Black manufactured by Denki Kagaku K.K. and Shawinigan Acetylene Black manufactured by Shawinigan Chemical Co., the conducting furnace black includes Continex CF manufactured by Continental Carbon Co. and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International. Among these, acetylene black is advantageously used herein because it has a minimal impurity content and a well developed secondary structure. Also Ketjen Black EC and Ketjen Black EC-600JD are advantageous because high conductivity is available with low loading due to their outstanding specific surface area.

The conductive carbon black may be used alone or in admixture of two or more species, preferably in an amount of from 1 to 50 parts, more preferably from 5 to 20 parts by weight per 100 parts by weight of diorganopolysiloxane (A). Less than 1 parts of carbon black would sometimes fail to provide desired electric conduction whereas more than 50 parts of carbon black would provide an electric resistance of less than $10^2$ Ω-cm which falls outside the desired semiconductive region.

Conductive zinc oxide is commercially available. For example, conductive zinc oxide commercially available from Honjo Chemical K.K. is useful. Zinc oxide is preferably used in an amount of from 50 to 300 parts, more preferably from 80 to 250 parts by weight per 100 parts by weight of diorganopolysiloxane (A), thereby providing an electric resistivity of $10^5$ to $10^{10}$ Ω-cm. Less than 50 parts of zinc oxide would sometimes fail to provide desired electric conduction whereas more than 300 parts would adversely affect dynamic properties. Addition amounts of 100 to 250 parts by weight are especially preferred.

Conductive titanium oxide is commercially available under the trade name ET-500W from Ishihara Industry K.K., for example. It preferably has a nominal composition of $TiO_2 \cdot SnO_2$ doped with Sb. The amount of titanium oxide added is the same as that of zinc oxide.

For curing of the silicone rubber composition, a curing agent is generally used. The curing agent may be selected from numerous well-known curing agents which are used in vulcanizing conventional conductive silicone rubber to induce vulcanization or curing through radical reaction, addition reaction or condensation reaction. Any curing mechanism is employed.

Where the organopolysiloxane of formula (1) contains an alkenyl group, for example, useful are organic peroxides including alkyl peroxides such as di-t-butylperoxide and 2,5-dimethyl-2,5-di(t-butylperoxy)hexane and aralkyl peroxides such as dicumyl peroxide. The amount of the organic peroxide is preferably 0.1 to 5 parts by weight per 100 parts by weight of the organopolysiloxane of formula (1). A combination of a platinum series catalyst with an organohydrogenpolysiloxane having at least two hydrogen atoms each attached to a silicon atom in a molecule is a useful addition reaction curing agent. The organohydrogenpolysiloxane is preferably used in an amount such that the molar ratio of SiH group in the organohydrogenpolyiloxane to alkenyl group in the organopolysiloxane of formula (1) is in the range of 0.5 to 5. The platinum series catalyst is used in a catalytic amount. Where the organopolysiloxane of formula (1) contains a hydroxyl group, a polyfunctional alkoxysilane or siloxane and an organic metal acid salt may be used as a condensation curing agent. The amount of curing agent is approximately equal to that used with conventional conductive silicone rubber.

If desired, the silicone rubber composition may further contain reinforcing silica fillers such as silica hydrogel (hydrous silicic acid) and silica aerogel (silicic anhydride fumed silica); fillers such as clay, calcium carbonate, diatomaceous earth, and titanium dioxide; dispersants such as low molecular weight siloxane esters and silanols, e.g., diphenylsilane diol; heat resistance enhancers such as iron oxide, cerium oxide and iron octylate; various carbon functional silanes for improving adhesion and workability; and platinum compounds for imparting flame retardancy.

According to the present invention, a cured layer (silicone rubber layer) of the above-defined semiconductive silicone rubber composition is formed around a cylindrical mandrel or metal core to form a semiconductive roll. The material and size of the mandrel is suitably selected depending on the intended type of roll. Also the molding and curing methods of the silicone rubber composition are suitably selected. For example, molding can be done by any of pressure molding, transfer molding, extrusion molding, injection molding and calendering. The curing method depends on the type of curing agent used.

The semiconductive cured layer or silicone rubber layer effectively provides a resistance of $1\times10^3$ to $1\times10^{10}$ Ω-cm between its outer surface and the mandrel. In this range of resistance, the silicone rubber layer provides an electric resistance varying within two orders of magnitude, preferably one order of magnitude. It is preferred as a semiconductive layer on triboelectric charging rolls, transfer rolls, developing rolls and paper feeding rolls in developing apparatus.

There has been described a semiconductive roll covered with a silicone rubber layer having stable resistivity in the semiconductive region which does not depend on molding conditions, the resistivity providing minimal variation. The silicone rubber layer is improved in processability, vulcanizing properties, and rubbery elasticity.

EXAMPLE

Examples of the present invention are given below by way of illustration and not by way of limitation. All parts are by weight.

EXAMPLES 1–3 & COMPARATIVE EXAMPLE 1

A silicone rubber composition was prepared by blending a methylvinylpolysiloxane consisting of 99.85 mol % of a dimethylsiloxane unit and 0.15 mol % of a methylvinylsiloxane unit and having an average degree of polymerization of about 8,000, treated silica R-972 (Nippon Aerosil K.K.), and spherical silicone elastomer particles KMP594 (particle size 3–10 μm, Shin-Etsu Chemical Co., Ltd.) in the amounts shown in Table 1, adding acetylene black, and kneading the mixture. Then an organic peroxide, 2,5-dimethyl-2,5-di(t-butylperoxy)hexane was added to and kneaded with the composition. The resulting compound was molded over and cured to a mandrel, obtaining a roll with an outer diameter of 20 mm. The molding conditions included a temperature of 165° C., a time of 15 minutes, and a pressure of 30 kgf/cm². As shown in FIG. 1, the roll 1 included the elongated cylindrical mandrel 2 which on the majority of its surface was covered with the annular silicone rubber layer defining the roll surface.

The roll (silicone rubber layer) was measured for hardness and electric properties. The results are shown in Table 1.

Hardness measurement is in accord with JIS K 6301. Electric resistance was measured, as shown in FIG. 1, by contacting a roll 1 with electrode strips 3 and measuring the resistance between each electrode strip 3 and the mandrel 2 by means of a resistance meter 4. Twenty electrode strips 3 of 7 mm wide were spaced 3 mm from each other. Measurement was thus done at 20 axially spaced-apart points to evaluate resistance variation. The measurement voltage was 100 volts and the meter 4 was a ultra-high resistance meter R8340 by Advanced Test Digital K.K.

EXAMPLE 4–5 & COMPARATIVE EXAMPLE 2

Example 1 was repeated except that the acetylene black was replaced by conductive zinc oxide (Honjo Chemical K.K.) or white conductive titanium oxide ET-500W (Ishihara Industry K.K.) in the amount shown in Table 1. Hardness and resistance were measured, with the results shown in Table 1.

TABLE 1

|  | Example | | | | | Comparative Example | |
|---|---|---|---|---|---|---|---|
|  | 1 | 2 | 3 | 4 | 5 | 1 | 2 |
| Methylvinyl-polysiloxane | 100 | 100 | 100 | 100 | 100 | 100 | 100 |
| KMP-594 | 20 | 50 | 100 | 20 | 20 | — | 3 |
| R-972 | 20 | 20 | 20 | 5 | 5 | 20 | 5 |
| Acetylene black | 13 | 13 | 13 |  |  | 13 |  |
| Zinc oxide |  |  |  | 200 |  |  | 200 |
| Titanium oxide |  |  |  |  | 200 |  |  |
| Organic peroxide | 1.6 | 1.6 | 1.6 | 1.6 | 1.6 | 1.6 | 1.6 |
| Hardness | 40 | 38 | 36 | 55 | 53 | 40 | 55 |
| Resistance (Ω-cm) | $1 \times 10^5$ – $1 \times 10^6$ | $5 \times 10^3$ – $5 \times 10^5$ | $3 \times 10^4$ – $1 \times 10^5$ | $1 \times 10^7$ – $1 \times 10^8$ | $5 \times 10^7$ – $5 \times 10^8$ | $1 \times 10^4$ – $1 \times 10^7$ | $1 \times 10^6$ – $1 \times 10^{10}$ |

As is evident from Table 1, the silicone rubber compositions loaded with spherical silicone elastomer particles (Examples 1–5) provided stable resistance measurements in the semiconductive region as compared with the composition free of spherical silicone elastomer particles (Comparative Example 1) and the composition loaded with a smaller amount of spherical silicone elastomer particles (Comparative Example 2). In the inventive compositions, the resistance varied only over one order of magnitude.

Although some preferred embodiments have been described, many modifications and variations may be made thereto in the light of the above teachings. It is therefore to be understood that within the scope of the appended claims, the invention may be practiced otherwise than as specifically described.

We claim:

1. A semiconductive roll comprising a mandrel and a semiconductive layer enclosing the mandrel, said semiconductive layer being obtained by curing to the mandrel a silicone rubber composition comprising (A) 100 parts by weight of an organopolysiloxane of the following average compositional formula (1):

$$R_n SiO_{(4-n)/2} \qquad (1)$$

wherein R is an unsubstituted monovalent hydrocarbon group, a halogenated hydrocarbon group or a cyanohydrocarbon group, and n is a positive number of 1.95 to 2.05, (B) 5 to 200 parts by weight of spherical silicone elastomer particles having a mean particle size of 0.1 to 100 μm, and (C) a conductive material, said semiconductive layer having an electric resistivity in the semiconductive range of $10^3$ to $10^{10}$ Ω-cm between its outer surface and the mandrel and providing an electric resistivity varying by a factor of 100 or less within said semiconductive range.

2. A semiconductive roll according to claim 1 wherein said conductive material is at least one member selected from the group consisting of conductive carbon black, conductive zinc oxide and conductive titanium oxide.

3. A semiconductive roll according to claim 1 wherein said semiconductive roll is a triboelectric charging roll, transfer roll or developing roll in a developing apparatus.

4. A semiconductive roll according to claim 1, wherein R is a $C_{1-10}$ unsubstituted monovalent hydrocarbon group.

5. A semiconductive roll according to claim 4, wherein R is an alkyl group.

6. A semiconductive roll according to claim 4, wherein R is a methyl, ethyl, propyl, cyclopentyl, cyclohexyl, vinyl, allyl, cycloalkenyl, phenyl or tolyl group, each optionally substituted by halogen or cyano.

7. A semiconductive roll according to claim 1, wherein the organopolysiloxane has a dimethylpolysiloxane backbone optionally containing at least one phenyl, vinyl or 3,3,3-trifluoropropyl group.

8. A semiconductive roll according to claim 1, wherein the organopolysiloxane contains alkenyl groups in an amount of 0.02 to 5 mol %, based on R.

9. A semiconductive roll according to claim 1, wherein the degree of polymerization of the organopolysiloxane is at least 100.

10. A semiconductive roll according to claim 1, wherein the degree of polymerization of the organopolysiloxane is 1,000 to 30,000.

11. A semiconductive roll according to claim 1, wherein the degree of polymerization of the organopolysiloxane is 3,000 to 10,000.

12. A semiconductive roll according to claim 1, wherein the silicone elastomer particles have a mean particle size of 0.5 to 40 μm.

13. A semiconductive roll according to claim 1, wherein the silicone elastomer particles are prepared by a process comprising emulsifying a vinyl-containing organopolysiloxane and an organohydrogen polysiloxane in water and a surfactant, and effecting an addition reaction in the presence of a platinum catalyst.

14. A semiconductive roll according to claim 1, wherein the amount of the silicone elastomer particles is 10 to 150 parts by weight of (A).

15. A semiconductive roll according to claim 1, wherein the conductive material is at least one of conductive carbon black, conductive zinc oxide, conductive titanium oxide, silver or nickel-coated glass beads, or graphite.

16. A semiconductive roll according to claim 1, wherein 1 to 50 parts by weight of carbon black per 100 parts by weight of (A) is used.

17. A semiconductive roll according to claim 1, wherein 50 to 300 parts by weight of conductive zinc oxide per 100 parts by weight of (A) is used.

* * * * *